United States Patent
Markovic et al.

(10) Patent No.: US 11,657,090 B2
(45) Date of Patent: May 23, 2023

(54) DATA SEARCHING, ENRICHMENT AND CONSUMPTION TECHNIQUES USING EXPLORATION AND/OR PRODUCTION ENTITY RELATIONSHIPS

(71) Applicant: Schlumberger Technology Corporation, Sugar Land, TX (US)

(72) Inventors: Hrvoje Markovic, Houston, TX (US); Lucas Natraj, Katy, TX (US); Nils Kjetil Vestmoen Nilsen, Asker (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 229 days.

(21) Appl. No.: 16/646,174

(22) PCT Filed: Sep. 12, 2018

(86) PCT No.: PCT/US2018/050727
§ 371 (c)(1),
(2) Date: Mar. 11, 2020

(87) PCT Pub. No.: WO2019/055549
PCT Pub. Date: Mar. 21, 2019

(65) Prior Publication Data
US 2020/0272662 A1    Aug. 27, 2020

Related U.S. Application Data

(60) Provisional application No. 62/557,512, filed on Sep. 12, 2017.

(51) Int. Cl.
*G06F 16/00*  (2019.01)
*G06F 16/901*  (2019.01)
*G06F 16/9032*  (2019.01)

(52) U.S. Cl.
CPC .... *G06F 16/9024* (2019.01); *G06F 16/90324* (2019.01)

(58) Field of Classification Search
CPC .......... G06F 16/9024; G06F 16/90324; G01V 99/005
See application file for complete search history.

(56) References Cited

U.S. PATENT DOCUMENTS

2004/0103376 A1*  5/2004  Pandey .................... E21B 41/00
                                                                        715/251
2006/0047732 A1*  3/2006  Kudo ..................... G06F 16/328
(Continued)

FOREIGN PATENT DOCUMENTS

CN    104504094 A    4/2015
WO    2016111710 A1  7/2016

OTHER PUBLICATIONS

Guo et al., "Design and implementation of domain ontology-based oilfield non-metallic pipe information retrieval system," (Year: 2012).*

(Continued)

*Primary Examiner* — Syed H Hasan
(74) *Attorney, Agent, or Firm* — Michael Guthrie

(57) ABSTRACT

Methods, apparatus, systems, and computer-readable media are set forth for processing exploration and production data to make such data more readily searchable for clients seeking to leverage the data for analytics and other services. The exploration and production data can be processed to generate a graph database that includes multiple nodes and node edges. The nodes can represent different portions of an exploration and production system, and the node edges can represent relationships between the different portions of the exploration and production system. Search suggestions be auto-filled at an interface of the graph database based on data available at the graph database. In this way, a user can be (Continued)

readily provide detailed search queries, without having to be completely cognizant of all the data available in the graph database.

20 Claims, 10 Drawing Sheets

(56) References Cited

U.S. PATENT DOCUMENTS

| | | | | |
|---|---|---|---|---|
| 2010/0114493 | A1* | 5/2010 | Vestal | E21B 41/00 |
| | | | | 702/9 |
| 2012/0054270 | A1* | 3/2012 | Foreman | G06Q 10/10 |
| | | | | 709/203 |
| 2012/0195166 | A1 | 8/2012 | Rocha et al. | |
| 2013/0218899 | A1 | 8/2013 | Raghavan et al. | |
| 2014/0222826 | A1 | 8/2014 | DaCosta et al. | |
| 2014/0310633 | A1* | 10/2014 | McLellan | G06F 16/29 |
| | | | | 715/771 |
| 2015/0339405 | A1 | 11/2015 | Vora et al. | |
| 2016/0048600 | A1 | 2/2016 | Singh et al. | |
| 2016/0203490 | A1* | 7/2016 | Gupta | G06Q 20/4016 |
| | | | | 705/44 |
| 2016/0210298 | A1* | 7/2016 | Thompson, III | G06F 16/288 |
| 2016/0274781 | A1* | 9/2016 | Wilson | G06F 3/04847 |
| 2016/0335360 | A1* | 11/2016 | Falcone | G06F 16/9535 |
| 2017/0006135 | A1* | 1/2017 | Siebel | H04L 67/12 |
| 2017/0097961 | A1 | 4/2017 | Li | |
| 2017/0109356 | A1* | 4/2017 | Sawai | G06F 9/453 |
| 2017/0228470 | A1 | 8/2017 | DaCosta et al. | |
| 2017/0316006 | A1* | 11/2017 | Shukla | G06F 16/24578 |
| 2018/0025093 | A1* | 1/2018 | Xia | G06F 16/90335 |
| | | | | 707/602 |
| 2018/0113927 | A1* | 4/2018 | Juarez | G06F 16/903 |
| 2018/0203919 | A1* | 7/2018 | Mackay | G06F 16/2237 |

OTHER PUBLICATIONS

International Preliminary Report on Patentability for the counterpart International patent application PCT/US2018/050727 dated Mar. 26, 2020.
Extended Search Report issued in European Patent Application No. 18855743.3 dated Apr. 28, 2021, 9 pages.
International Search Report and Written Opinion for the counterpart International patent application PCT/US2018/050727 dated Jan. 11, 2019.
Communication Pursuant to Article 94(3) issued in European Patent Application No. 18855743.3 dated Sep. 27, 2022, 7 pages.

* cited by examiner

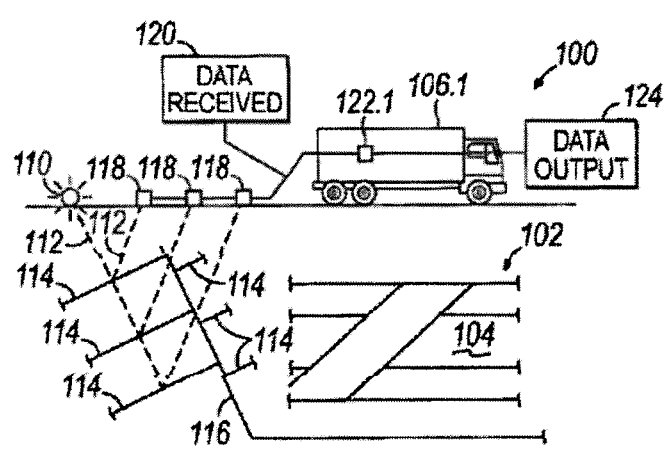
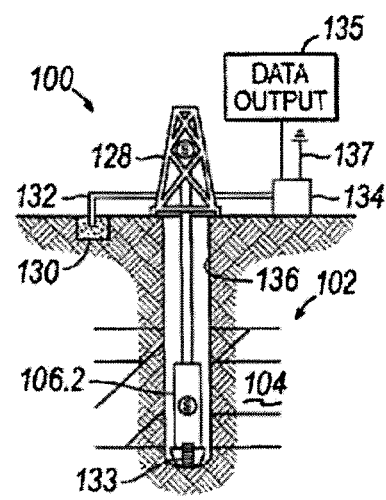
FIG. 1.1
FIG. 1.2
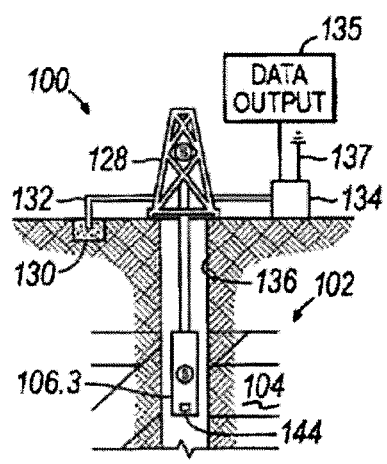
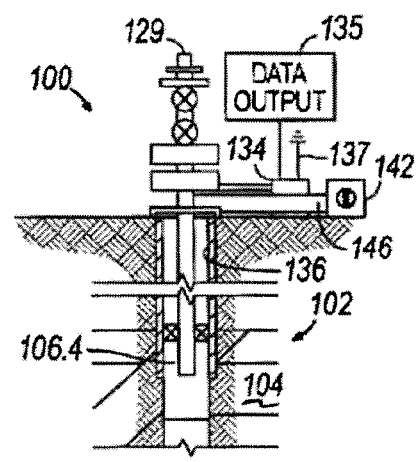
FIG. 1.3
FIG. 1.4

DATA SEARCHING, ENRICHMENT AND CONSUMPTION TECHNIQUES USING EXPLORATION AND/OR PRODUCTION ENTITY RELATIONSHIPS

CROSS-REFERENCE TO RELATED APPLICATION(S)

This application claims priority to and the benefit of a US provisional application having Ser. No. 62/557,512, filed 12 Sep. 2017, which is incorporated by reference herein

BACKGROUND

In the oil and gas industry, data is often generated from a variety of sources for clients that seek to remain privy to the latest trends in exploration and production technology. When data is not consistent or inaccessible, decisions made by such clients may not be the most well-informed, potentially resulting in production inefficiencies. Furthermore, enterprises of all types and sizes are coping with a wider variety of data at a very large scale, making it more difficult than ever to realize production insights. At the same time with the growth in cloud based commodity computing, it is becoming increasingly difficult to package insights for delivery to customers and clients.

SUMMARY

Methods, apparatus, systems, and computer-readable media are set forth for processing exploration and production data to make such data more readily searchable for clients seeking to leverage the data for analytics and other services. In some implementations, a method implemented by one or more processors is set forth as including operations such as receiving source data from a remote device. The source data can be associated with a portion of an exploration and production system. The method can also include generating, based on the source data, a node and a node edge for a graph database. The node can identify the portion of the exploration and production system and the node edge can identify a relationship between the node and a separate node of the graph database. The method can further include receiving at least a portion of text corresponding to a search query for retrieving data associated with the graph database, and identifying one or more graph database entries associated with the portion of text. The one or more graph database entries can correspond to one or more nodes or node edges of the graph database. Additionally, the method can include causing one or more search suggestions to be presented based on the identified one or more graph database entries. The one or more suggestions identify at least one node or one node edge with which one or more suggestions correspond.

In some implementations, the graph database can be accessible through a search interface that includes a field for receiving the text corresponding to the search query. The one or more search suggestions identify multiple different portions of the exploration and production system. The multiple different portions of the exploration and production system include a well, a wellbore, or a field. The graph database can be accessible to a plugin manager, and the method can also include causing, in response to receiving the source data, a plugin manager to receive a notification indicating that updated exploration and production data has been received. In some implementations, the method can include identifying a client device that previously accessed the graph database, and causing, in response to receiving the source data, the client device to receive a notification indicating that updated exploration and production data has been incorporated into the graph database.

In other implementations, a system is set forth as including one or more processors, and memory configured to store instructions that, when executed by one or more processors, cause the one or more processors to perform operations that include receiving, at an interface associated with a graph database that includes exploration and production data, a search query for identifying one or more entities provided in the graph database. The one or more entities can correspond to at least one node and at least one node edge stored at the graph database. The operations can also include determining that a property of a node or a node edge includes a similarity to the search query received at the interface. The property can identify a portion of an exploration and production system. The operations can also include generating one or more search query results based on the similarity between the property and the search query, and causing the one or more search query results to be presented according to a degree of similarity between the property and the search query.

The property can be an identifier for a piece of equipment of the exploration and production system. The node edge can identify a bi-directional relationship between two different nodes. In some implementations, the operations can also include receiving updated exploration and production data from a remote device that is in communication with the exploration and production system, and causing the graph database to be updated to include an additional node and an additional node edge. Each additional node and additional node edge can be associated with the updated exploration and production data. The one or more search query results can identify multiple different portions of the exploration and production system. The multiple different portions of the exploration and production system can include a well, a wellbore, or a field.

A non-transitory computer readable medium configured to store instructions that, when executed by one or more processors, cause the one or more processors to perform operations that include receiving source data from a remote device. The source data can be associated with a portion of an exploration and production system. The operations can also include generating, based on the source data, a node and a node edge for a graph database. The node can identify the portion of the exploration and production system and the node edge can identify a relationship between the node and a separate node of the graph database. The operations can further include receiving at least a portion of text corresponding to a search query for retrieving data associated with the graph database, and identifying one or more graph database entries associated with the portion of text. The one or more graph database entries can correspond to one or more nodes or node edges of the graph database. The operations can further include causing one or more search suggestions to be presented based on the identified one or more graph database entries. The one or more suggestions can identify at least one node or one node edge with which one or more suggestions correspond.

The graph database can be accessible through a search interface that includes a field for receiving the text corresponding to the search query. The one or more search suggestions identify multiple different portions of the exploration and production system. The multiple different portions of the exploration and production system include a well, a wellbore, or a field. The graph database can be accessible to a plugin manager, and the operations can further include causing, in response to receiving the source data, a plugin manager to receive a notification indicating that updated exploration and production data has been received. In some implementations, the operations can include identifying a client device that previously accessed the graph database, and causing, in response to receiving the source data, the client device to receive a notification indicating that updated exploration and production data has been incorporated into the graph database. The portion of the exploration and production system can include a piece of equipment of the exploration and production system. The node edge can identify a bi-directional relationship between two different nodes.

Some implementations also include a system including one or more processors and memory configured to store instructions that, when executed by one or more processors, cause the one or more processors to perform any of the aforementioned operations, as well as a non-transitory computer readable medium configured to store instructions that, when executed by one or more processors, cause the one or more processors to perform any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 1.1-1.4 illustrate simplified, schematic views of an oilfield having subterranean formation containing reservoir therein in accordance with implementations of various technologies and techniques described herein.

DETAILED DESCRIPTION OF THE INVENTION

Figure 2:
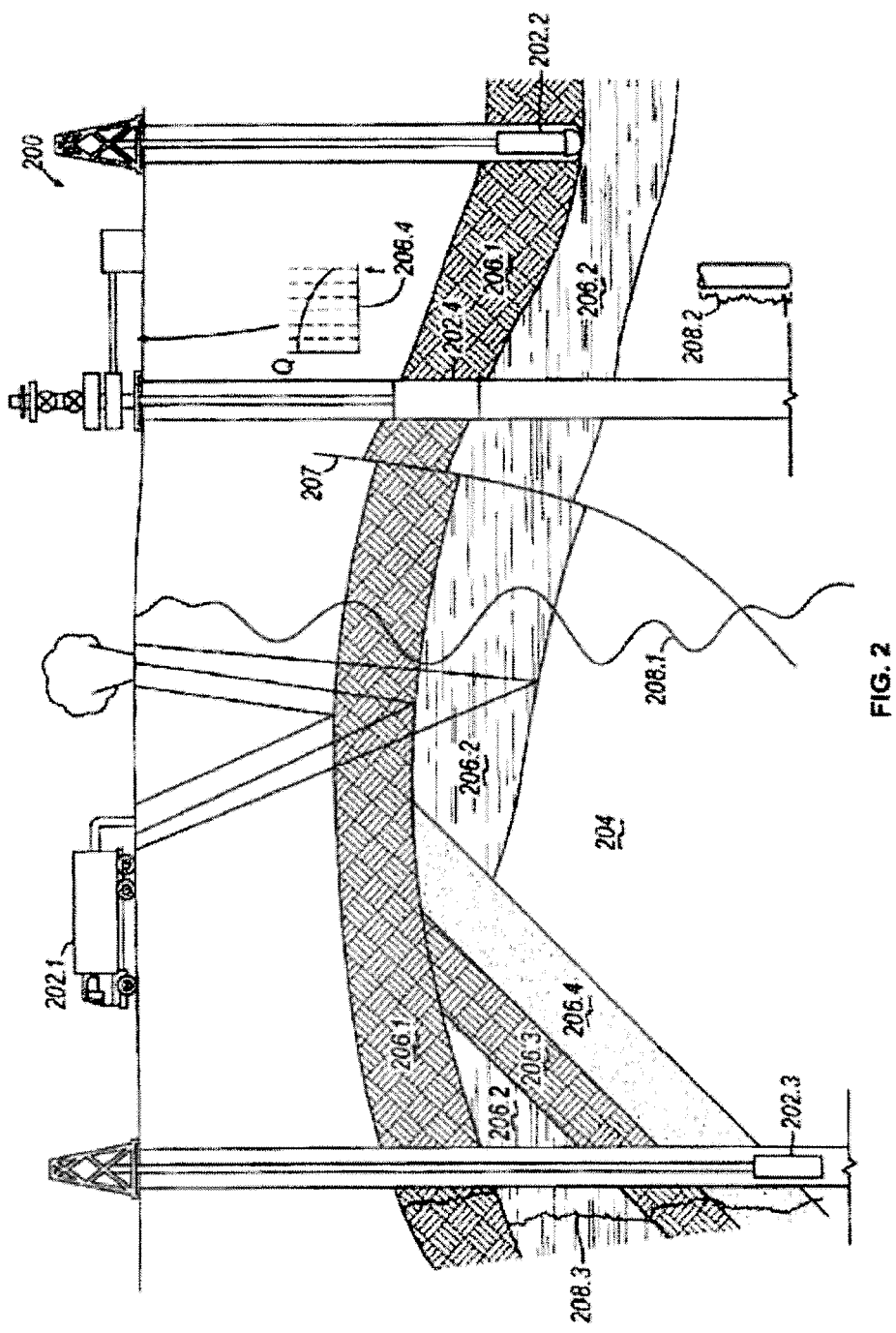
FIG. 2 illustrates a schematic view, partially in cross section of an oilfield having a plurality of data acquisition tools positioned at various locations along the oilfield for collecting data from the subterranean formations in accordance with one or more implementations.

The described embodiments relate to systems, methods, and apparatus for processing exploration and production data to make such data more readily searchable for clients seeking to leverage the data for analytics and other services. In this regard, the term "exploration and production" may refer to exploration-related activities, production-related activities or activities associated with both exploration and production aspects of natural resource recovery. A database that provides exploration and production data can reference numerous data entities that can identify portions of an exploration and production system. For instance, data entities can identify different oil fields and relationships between the different oil fields. Typically, a data manager or application can process the data entities to create indexes that allow for more effective searching and retrieval of attributes of the data entities. However, when the relationships between data entities are relied upon by clients and end users as much as the aforementioned attributes, such indexes can limit the visibility to entity data relationships. In order to overcome this and other limitations, the entity data can be organized in a graph database, which can effectively represent the relationships between data entities in a manner that is more readily searchable.

In some implementations, the graph database can be embodied as a backend service for one or more applications associated with an exploration and production system. For instance, the graph database can be a backend service relative to a data lake, which can include raw data collected from one or more exploration and production systems. An application accessible to the graph database can act as a search service for interacting with the graph database and provide intermediate results while a user is simultaneously providing a search query to the application. In some implementations, the graph database can employ or otherwise be accessible to one or more machine learning algorithms for entity resolution, collective classification, link prediction between entities, and/or knowledge graph identification.

The graph database can be part of a backend of the data lake, which can be part of a system that includes source data and data lake applications. For instance, the source data can be provided from one or more source domains that include a variety of domain file formats and domain applications. The data lake applications can include a variety of applications that interact with different components of the data lake. For example, data lake contents can be represented in the graph database as nodes, node edges, and attributes identified by the nodes and the node edges. For instance, a node can represent a portion of an exploration and production system, such as an oil rig or an oil reserve. Furthermore, a node edge can represent a relationship between nodes, such as how a first node contributed to the formation of a second node. For example, a first node can identify an oil rig, a second node can identify an oil well, and a node edge extending from the first node to the second node can indicate that the oil rig created the oil well. The node edge can therefore be associated with a string or text such as, for example, "CREATED" or "PROVIDED." As the data lake is updated with additional data or edits to existing data, new nodes and node edges can be generated by one or more applications so that the updated data can be readily searchable. In some implementations, an application available to the graph database can be a guided search application that provides suggestions to a user that is attempting to query the graph database. Search suggestions from the guided search application can be based on data existing in the graph database and/or the data lake. Furthermore, search suggestions can be provided as autocomplete data that is presented at a user interface of the guided search application before, during, and/or after a search query has been submitted by a user to the graph database.

For instance, in some implementations, the data lake can be accessible to multiple different applications that can allow the data lake to be more readily searchable. For instance, the data lake applications can include parser applications, crawler applications, exporter applications, frontend applications, and/or any other application capable of preparing database entries for search queries from a client device. In some implementations, a client device can access a search application that includes a field for receiving search queries. In response to a user providing text to the field, one or more of the data lake applications can navigate through the graph database of the data lake in order to identify suggestions for search terms for the user. For example, when a user types the letter "L" into the search field, a data lake application can provide suggestions at a user interface of the data lake application. The suggestions can include entity identifiers such as "Log," "Field," "Well," Wellbore," and/or any other term that can be associated with exploration and production systems. Entity identifiers can correspond to names of nodes provided in the graph database. Other suggestions provided at the user interface can include property identifiers (e.g., "name"), and/or relationship identifiers (e.g., "from," "similar to," "created by," etc.).

In some implementations, intermediate results can also be presented to the user that is submitting a search query to a data lake application. Intermediate results and suggestions can be provided by one or more algorithms that dynamically create queries for the graph database using metadata from the graph database. The metadata can include types of nodes, relationships between nodes, frequencies for types of nodes, property values for nodes and node edges, and/or any other data that can be generated from the graph database. The suggestions and/or intermediate results can also be based on user input to the field of the user interface, and/or any other data provided by the user. Other applications that can be employed to improve suggestions and intermediate results can include an entity resolution application, a collective classification application, a link prediction application, and/or a knowledge graph identification application.

An entity resolution application can be tasked with identifying nodes that correspond to the same, or substantially the same entity identified by the nodes. Such an entity resolution application can operate to consolidate the data lake by generating and/or otherwise resolving connections between nodes. For instance, by eliminating or consolidating duplicate information, efficiency of the search features of the data lake can be improved. In some implementations, an application of the data lake applications can be tasked with comparing entities in order to identify incorrect or potentially inaccurate information. For example, if two entities are describing the same portion of an exploration and production system but have different attribute values, the entities can be labeled or assigned a value that indicates the two entities are potentially associated with inaccurate information. In other implementations, an application of the data lake applications can consolidate information provided at the data lake into one or more entries corresponding to a particular entity. For example, the data lake can include information about a wellbore, and the information can be obtained from measurements obtained during drilling. Furthermore, the data lake can include information related to wireline measurements, which can be collected after the wellbore has been cemented. Although this information can seem initially unrelated to the data lake, a data lake application can correlate the data in order to provide a more comprehensive graph database.

In some implementations, the data lake applications can include a classification application capable of inferring labels of nodes in the graph database in order to deduce values of attributes for entities in the graph database. Such classifications can be useful when forecasting events associated with portions of an exploration and production. For instance, collective classifications of nodes can be used to forecast tool failures and pipe malfunctions. When the graph database includes entities corresponding to a tool and its context, and a set of tools and their context, information regarding the failure of the set of tools can be used to predict when the tool when fail. Furthermore, similarities between the context of a pipe and the context of a wellbore being drills can be leveraged when making predictions about whether a pipe will malfunction.

In yet other implementations, a data lake application can be employed to generate one or more new graphs or entities from existing graphs or entities in the graph database. For instance, data corresponding to an operation of a client can be embodied as a graph in the graph database. A new graph or entity can be generated from the data in order to create a profile for the client that more accurately represents the operations of the client in order that services can be made more readily available for the client. Furthermore, potential issues associated with the client can be more efficiently resolved, at least based on the analysis being performed by the data lake applications.

In some implementations, the exploration and production data lake can contain hundreds of millions of oilfield entities that can have relationships between each other. This can represent a substantial quantity of both explicit and implicit information. In order to leverage this information, the information can be stored in a persistent storage and indexes can be created for the attributes of the interest so that the data can be efficiently searched. This approach can work well in case of flat or text heavy data but can be limiting in case of highly relationship centric data.

The rise of commercial graph databases has enabled a relationship centric representation of data. Most of these graph databases can have all the properties a persistent storage would usually need to have: atomicity, consistency, isolation, and durability (ACID). They can also be optimized for representing and retrieving relationships between entities. This is why the usage of such databases can be for the storage of highly interrelated data. Since these databases are optimized for use cases where data is relationship centric, they do not present the most optimal solution for the cases where the data are not. The penalty can be operational and maintenance cost, negative performance impact, etc.

Data provided in a data lake can be provided without an enforced canonical schema, and they may or may not be dominated by relationships. Additionally, the data could include bulk data, and use a graph database as a main persistence backend. To leverage the benefits of the relationship data but not to suffer from penalty, the graph database can be provided as a search and analytics backend instead of primary storage. Furthermore, a set of applications accessible to the graph database can be incorporated into the data lake architecture.

In some implementations, a system, or an integration of a graph database in a data lake is set forth wherein the graph database is used, not as an operational storage backend, but as a search and analytics backend. Additionally, an interactive guided search service can traverse through the graph database and give intermediate results and query suggestions while a user is querying the data lake. The data lake can also be accessible to an analytics backend resource used for knowledge representation and extraction. The analytics backend resource can be used by machine learning algorithms for entity resolution, collective classification, link prediction, and knowledge graph identification. Whenever the data is changed in the storage, the change can trigger the update of the graph so the graph will contain eventually consistent representation of the data in the storage. The graph database can represent the latest state of the entities (and their relationships) in the storage but, since storage supports time-based versioning, the graph database can be (re)created for any moment in time, reflecting the state of the data lake at that time.

An example part of the graph database created for data lake contents can be seen in the drawings where records from the data lake correspond to nodes (vertices) and links between records correspond to relationships (edges). Both the nodes and the node edges can have properties which represent transformed properties of the records and links from the storage. Having such a graph enables implementation of new functionalities inside data lake ecosystem, i.e., traversing between nodes through relationships can be done much faster than doing it in document storage. It is also much more efficient than trying to navigate through indexed documents in conventional search service.

One of applications for such a data lake graph is interactive guided search. In this guided search, as user is typing, a dedicated algorithm is traversing the graph database and giving suggestions based on the data that exists in the graph database. It does not only give query suggestions through autocomplete but also gives intermediate results. An example of guided search is shown in figure below where suggestions and corresponding graph traversal is shown while user is searching for logs.

By providing suggestions and intermediate top search results, this guided search does not only help in searching for information but also promotes data discovery. Searching for information happens when user is aware of the information (s)he is looking for. In this case, the unknown is the query string that user should write to get the data (s)he wants. Example of this is searching for: "Gamma Ray logs for wells in USA." Data discovery happens when user is looking at chained suggestions and finds relationships and properties (s)he was not aware that even existed. Example of this is user writing "Well in UK" and the getting following suggestions "having," "formation," "shale." This suggestion would show to the user that there is shale in UK wells.

Both suggestions and intermediate results are generated by an algorithm that dynamically creates a query for the graph that takes into account graph metadata (e.g., types of nodes and relationships, frequencies for types), graph data (e.g., property values) and user provided query segment. Another set of applications for such a graph are in field of data analytics for entity resolution, collective classification, link prediction, and knowledge graph identification. Entity resolution is the task of identifying nodes that correspond to same (or equal) underlying entity. The innovative approach in using graph entity resolution is using it for data lake cleaning and consolidating purposes. It enables: duplicates resolution—identification of records that present duplicate information (e.g., same wells coming from different data sources). Identifying duplicate information has significant implications on the efficiency of the data lake. Data quality assurance can be performed for identification of incorrect or questionable information. For example, if two records are describing the same entity but they have different value of a certain property, this can be used to label the property with lower confidence.

Entity consolidation can be performed by one or more applications for merging different projections of the same information into same logical unit (e.g., one record has some information about entity x and the other has additional information about entity x). For example, there can be a wellbore for which there is record describing measurements obtained during drilling. There can also be wireline measurements, done after the wellbore was cemented. From the perspective of data lake, this information can be unrelated because it is coming from different sources. Resolving that it is actually the same wellbore enables a much better view into actual wellbore state and could be used in, for example, wellbore stability analysis.

Collective classification is the task of inferring the labels of the nodes in the graph. When used in data lake, it can be used to deduce values of properties for records in the data lake. Two examples of using collective classification in E&P Data Lake are forecasting tool failures and stuck pipe. For instance, assuming that a graph or node is created for a record that describes a tool t and its context (the links it has to other records) and there is a subgraph containing set of tools T and their contexts. Even though there is no explicit information that would indicate likelihood of the tool failure for t, by analyzing similarity of subgraph for t with subgraphs in T, where there is information about failures, an algorithm could deduce the likelihood of failure for t. Similar approaches can be used for stuck pipe prediction. By using contextual information about where a stuck pipe happened and comparing it with contextual information about wellbore that is being drilled, an algorithm could estimate the risk of having a stuck pipe.

Link prediction can be a task of inferring the existence of node edges. When used in data lake context, it can refer to using the graph database of the data lake to find new relationships between records. An example of this is identifying new business possibilities. For instance, this can occur when there is a client that has a well running a tool showing strong anisotropy. This client could automatically be classified as a candidate for production optimization.

Knowledge graph identification can be used by any of the applications or operations discussed herein in order to infer a new graph or node based on an existing graph or node. In a data lake, this can correspond to generating new semantical information (new records) based on existing records. For example, based on a graph that has data of an existing client, a new graph (and underlying records) could be created that represent the profile of this client. Broadly speaking, by analyzing a graph database representing operational data for a client, a strategy model for that client can be inferred and tailored services can be offered. Nature of data relationships with the client can be identified and potential issues can be resolved and new opportunities can be leveraged.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the embodiments. However, it will be apparent to one of ordinary skill in the art that various embodiments may be practiced without these specific details. In other instances, well-known features have not been described in detail to avoid unnecessarily complicating the description.

FIGS. 1.1-1.4 illustrate simplified, schematic views of an oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is generally filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (5) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan generally sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein. In general, wireline tool 106.3 may thereby collect acoustic data and/or image data for a subsurface volume associated with a wellbore.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively.

These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 3:
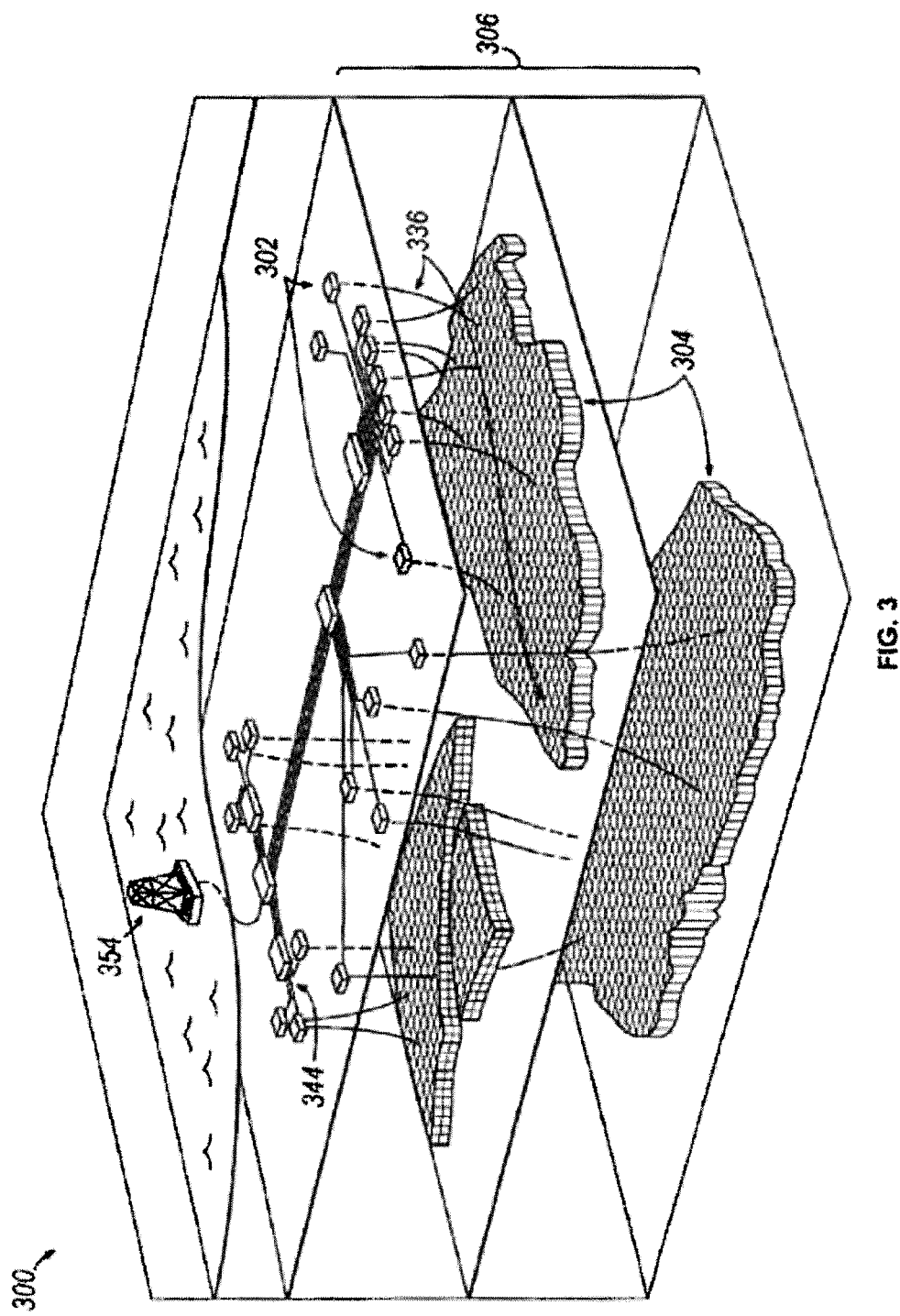
FIG. 3 illustrates a production system for performing one or more oilfield operations in accordance with one or more implementations.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 4:
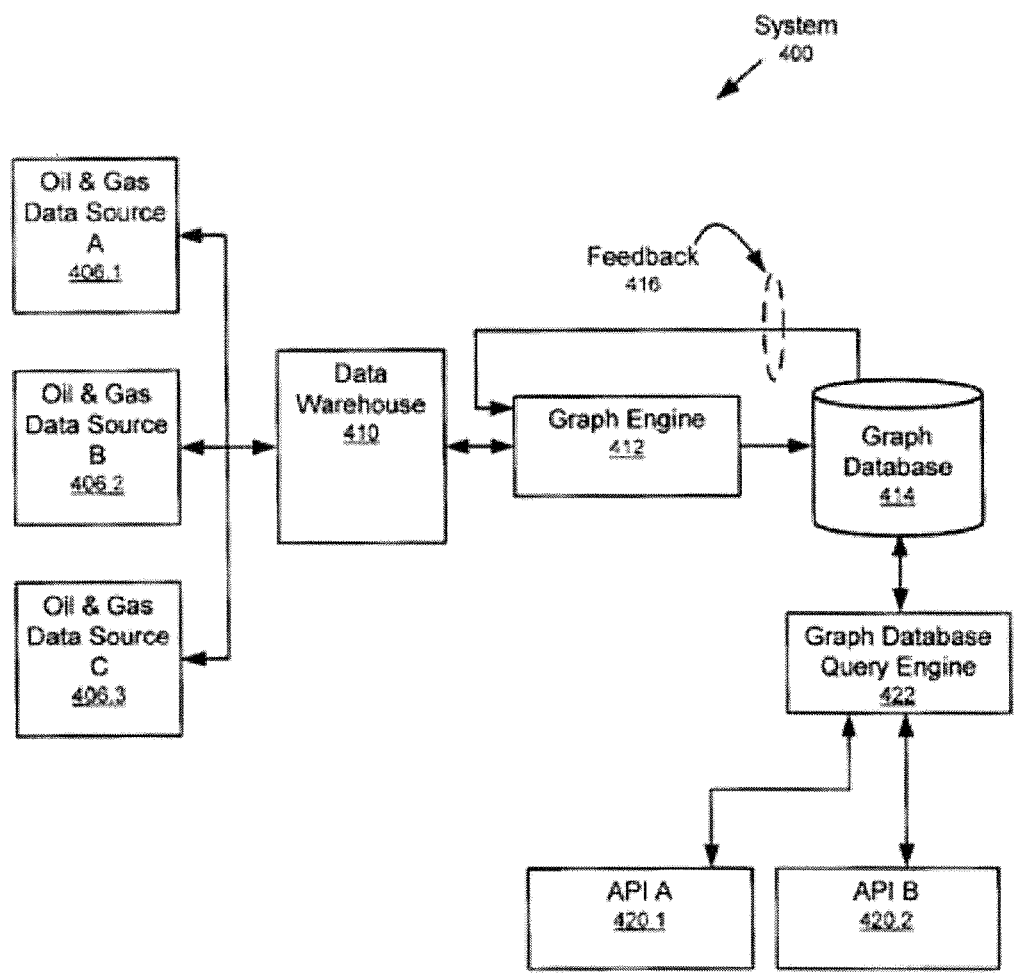
FIG. 4 illustrates a system in accordance with one or more implementations.

FIG. 4 shows a system 400 in accordance with one or more implementations. The system 400, or part of the system 400, may be located in a surface unit (e.g., surface unit 134). As shown in FIG. 4, the system 400 has multiple components including multiple data sources (e.g., OG Data Source A 406.1, OG Data Source B 406.2, OG Data Source C 406.3, a data warehouse 410, a graph engine 412, a graph database 414, a graph database query engine 422, and one or more APIs (e.g., API A 420.1, API B 420.2). Each of the components 406.1, 406.2, 406.3, 410, 412, 414, 422, 420.1, 420.2 may be located on the same computing device (e.g., server, mainframe, personal computer, laptop, tablet PC, smart phone, kiosk, etc.) or on different computing devices connected by a network of any size or topology with wired and/or wireless segments.

As shown in FIG. 4, the system 400 has multiple OG data sources 406.1, 406.2, 406.3. These OG data sources 406.1, 406.2, 406.3 may correspond to sensors or measurement tools on site in an oilfield. These OG data sources 406.1, 406.2, 406.3 may correspond to external databases or websites. The OG data sources 406.1, 406.2, 406.3 output data items. These data items may be of any type or size relevant to an oilfield. For example, these data items may include well fracturing depth-temperature-energy band data (real-time or playback from previously fractured wells), user annotations and comments, any open literature, etc.

In one or more implementations, the system 400 includes data warehouse 410. The data warehouse 410 may correspond to one or more repositories. The data warehouse 410 ingests (e.g., obtains and stores) the data values from the OG data sources 406.1, 406.2, 406.3. The data warehouse 410 is effectively a consolidated source of data items regarding an oilfield.

In one or more implementations, the system 400 includes the graph engine 412. The graph engine 412 applies one or more transformations (e.g., pipelines) to the data items to generate one or more transformed data items. Application of one or more transformations may be triggered by various conditions (e.g., changes in temperature, pressure, depth, composition in well, etc.). Application of one or more transformations may occur at set times or milestones. One or more transformations may be custom designs. One or more transformation include machine learning. Example transformations include: data cleansing (bound checks, NaN), conversion to different format, aggregates based on one or more state changes, statistical calculations (variance, mode, standard deviation).

In one or more implementations, the system 414 includes the graph database 414. The graph database 414 implements a knowledge graph for an oilfield. In other words, the graph database 414 is an OG graph database. The graph database 414 includes one or more nodes connected by one or more edges. Each node may correspond to one or more entities in the oilfield. Each edge is a relationship between two or more nodes. In one or more implementations, the graph engine 412 modifies (e.g., populates, enriches, shrinks, etc.) the graph database 414 based on the transformed data items. This may include modifying existing nodes and edges, removing existing nodes and edges, and/or inserting new nodes and new edges. The nodes or edges may include the transformed data items. For example, nodes may correspond to wells, client/customer ID, chemicals used in the oilfield. Edges may correspond to any links between these nodes & disconnected data silos.

As shown in FIG. 4, a feedback loop 416 may exist from the graph database 414 to the graph engine 412. One or more node or edges in the graph database 414 may be data values that are transformed by the graph engine 412.

In one or more implementations, the system 400 includes the graph database query engine 422. The graph database query engine 422 receives user requests regarding an oilfield entity and generates a result to the request. The result may be generated by traversing the graph database 414. The result may be a summary or digest regarding the oilfield entity. For example, the user request may be: "Give me a summary of all wells fractured between December 01 and December 31 in year XXXX for client A."

In one or more implementations, the system 400 includes multiple APIs 420.1, 420.2. It is through the APIs 420.1, 420.2 that users may issue request and obtain (e.g., view, print) results in response to the request. APIs provide data to monitoring front-end and may have a rich user interface to view data close to real-time in the form of heat maps, line plots, etc.

Figure 5:
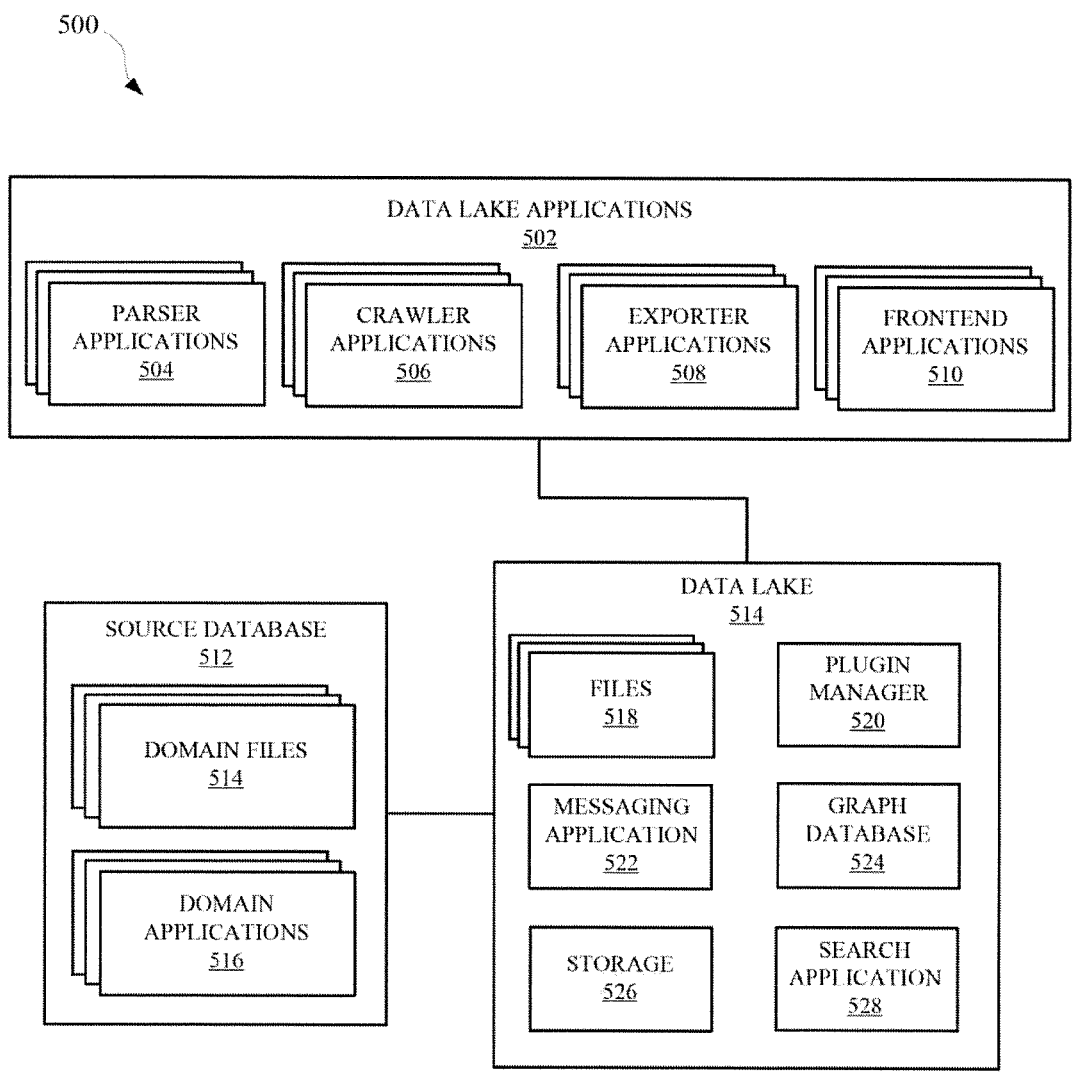
FIG. 5 illustrates a system for providing a searchable graph database that is part of a data lake of exploration and production data.

FIG. 5 illustrates a system 500 for providing a searchable graph database that is part of a data lake of exploration and production data. The system 500 can be embodied in one or more memory and/or processing devices, which can be connected over a network. The data lake can include a graph database that includes connections of nodes, node edges, and/or properties corresponding to various portions of an exploration and production system. For instance, the exploration and production system can include oil and gas related equipment and data. A data lake 514 of the system 500 can be provided data from a source database 512, which can include domain files 514 and domain applications 516. The domain can refer to one or more locations, networks, platforms, and/or other systems capable of providing data related to an exploration and production system. The data lake 514 can use the data from the source database 512 for compiling a graph database 524, which can be made searchable and/or otherwise available to users and other applications. For instance, the graph database 524 can be embodied as a backend service that can be accessible to data lake applications 502 via a plugin manager 520 of the data lake 514.

When a new file 518 is received from the source database 512, a message can be generated at the data lake 514 and received at the messaging application 522. The messaging application 522 can operate to provide notifications or other signals to the graph database 524 and/or a search application

528 when new data has been received from the source database 512. In some implementations, notifications or other signals can be provided from a storage 526 of the system 500 to the messaging application 522 to indicate when domain applications 516 have made changes to the storage 526. Such changes can correspond to updates to data (e.g., spud date, reservoir size, etc.) that are received from the domain applications 516. The messaging application 522 can then provide an indication to the graph database 524 and/or the search application 528 in order that most recent data can be presented in response to queries from the data lake applications 502.

In some implementations, the system 500 can include data lake applications 502, which can include one or more of a parser application 504, a crawler application 506, exporter application 508, frontend application 510, and/or any other application capable of accessing data in a data lake. The data lake applications 502 can interface with the data lake 514 through a plugin manager 520. The plugin manager 520 can enable the data lake applications 502 to access various portions of the data lake 514 including the files 518, storage 526, graph database 524, search application 528, and/or any other portion of the graph database 524.

Figure 6:
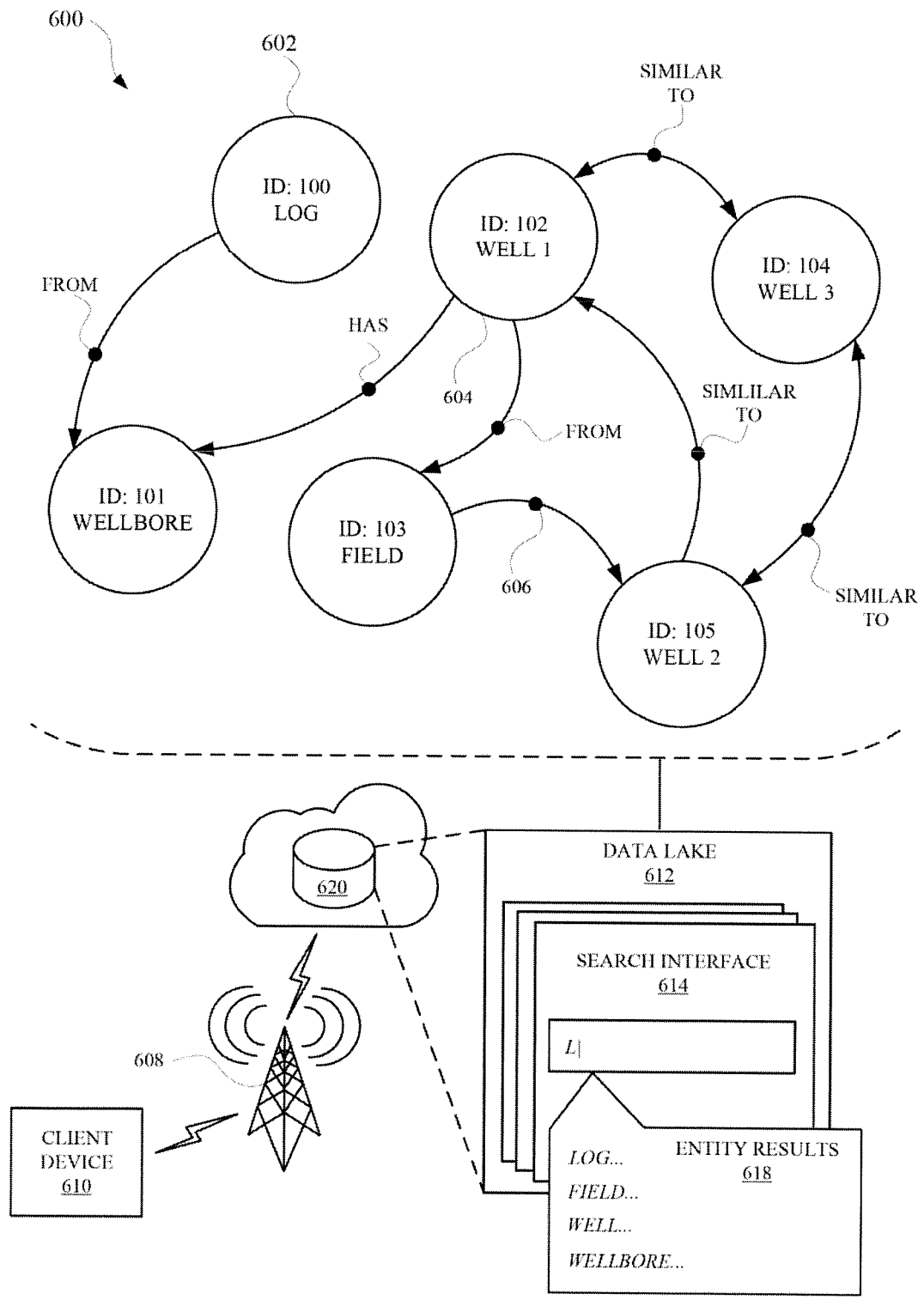
FIG. 6 illustrates a system diagram for providing search suggestions using a graph database that includes exploration and production system data.

FIG. 6 illustrates a system diagram 600 for providing search suggestions using a graph database that includes exploration and production system data. Specifically, the data lake 612 can include a graph database, which can include nodes 604 and node edges 606. Each node 604 can represent an entity of an exploration and production system, such as a well, a field, a data log, a wellbore, etc. Furthermore, the node edges 606 can identify relationships between the nodes 604. For instance, the "LOG" node with ID:100 can refer to a data log that is generated based on an operation of a wellbore identified by the "WELLBORE node with ID:101. The "LOG" node can therefore include a node edge "FROM," indicating that the data log was from the wellbore operation. Similarly, the wells of the graph database can include bi-directional node edges 606 indicating that the relationship identified by the node edges 606 is logical in both directions (e.g., toward a node 604 and away from a node 604).

Searching the graph database of the data lake 612 can be undertaken through a search interface 614, which can enable client devices 610 to submit queries to the data lake 612. Specifically, a client device 610 can access the data lake 612, which can be at least partially or completely stored on a remote device 620, over a network 608 such as the internet or other network of devices. The data lake 612 can include or be accessible from a search interface 614, which can be hosted at the remote device 620 or provided by an application accessible to the client device 610. The search interface 614 can receive a query, such as a partial text entry, as illustrated in FIG. 6, which shows the input "L" being provided to a field of the search interface 614. In response, the data lake 612 can cause the graph database to be analyzed to identify entities, relationships, and/or properties of the graph database that are associated with the input.

In order for the graph database to be analyzed for responding to search queries, text of a search query can be parsed and parsed portions of the search query can be compared to portions of the graph database. For instance, as illustrated in FIG. 6, the text input "L" can be compared to node identifiers (e.g., log, well 1, well 2, well bore) in order to identify similar text to the text input. Furthermore, the text input "L" can be compared to node edge identifiers (e.g., from, similar to, has) in order to identify relationship between nodes that could be presented as search suggestions. Other properties of the graph database can also be presented when the text input matches the properties of the graph database. In some implementations, identifiers for the structure of the database that the suggestion corresponds to can be presented with a search suggestion. For instance, when a search suggestion corresponds to a node identifier, the term "entity" can be presented simultaneous to the search suggestion being presented at the search interface 614. Furthermore, when a different search suggestion corresponds to a node edge identifier, the term "relationship" can be presented simultaneous to the search suggestion being presented at the search interface 614.

Figure 7:
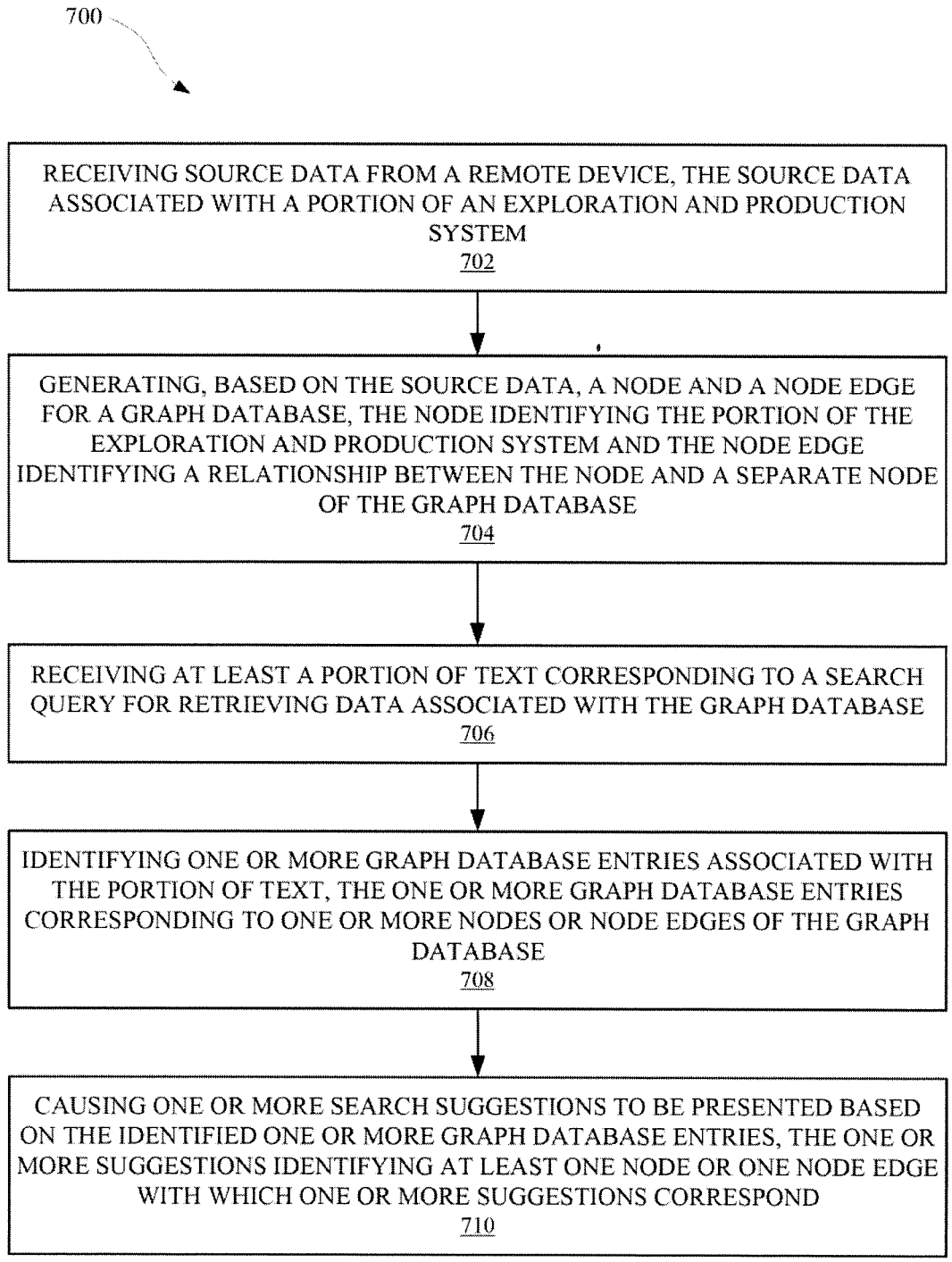
FIG. 7 illustrates a method for providing search query suggestions using a graph database that includes exploration and production data.

FIG. 7 illustrates a method 700 for providing search query suggestions using a graph database that includes exploration and production data. The method 700 can be performed by a computing device, server device, and/or any other apparatus capable of accessing a graph database. The method 700 can include an operation 702 of receiving source data from a remote device. The source data can be associated with a portion of an exploration and production system. The method 700 can further include an operation 704 of generating, based on the source data, a node and a node edge for a graph database. The node can identify the portion of the exploration and production system and the node edge can identify a relationship between the node and a separate node of the graph database. The method 700 can also include an operation 706 of receiving at least a portion of text corresponding to a search query for retrieving data associated with the graph database. The method 700 can also include an operation 708 of identify one or more graph database entries associated with the portion of text. The one or more graph database entries can correspond to one or more nodes or node edges of the graph database. The method 700 can further include an operation 710 of causing one or more search suggestions to be presented based on the identified one or more graph database entries. The one or more suggestions can identify at least one node or one node edge with which one or more suggestions correspond.

Figure 8:
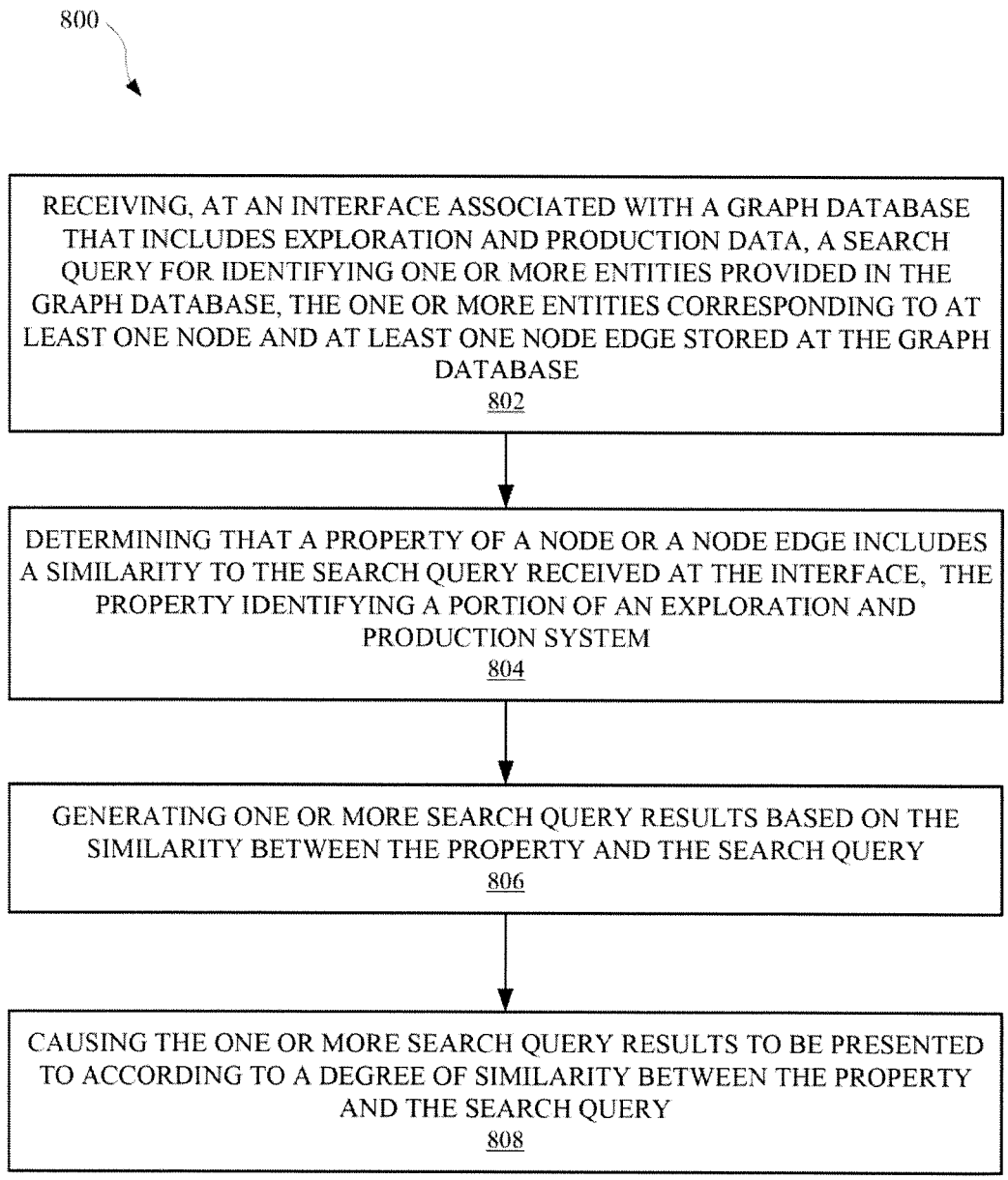
FIG. 8 illustrates a method for responding to a search query provided to a graph database.

FIG. 8 illustrates a method 800 for responding to a search query provided to a graph database. The method 800 can be performed by a computing device, server device, and/or any other apparatus capable of accessing a graph database. The method 800 can include an operation 802 of receiving, at an interface associated with a graph database that includes exploration and production data, a search query for identifying one or more entities provided in the graph database. The one or more entities can correspond to at least one node and at least one node edge stored at the graph database. The method 800 can also include an operation 804 of determining that a property of a node or a node edge includes a similarity to the search query received at the interface. The property can identify a portion of an exploration and production system. The method 800 can further include an operation 806 of generating one or more search query results based on the similarity between the property and the search query. Additionally, the method 800 can include an operation 808 of causing the one or more search query results to be presented to according to a degree of similarity between the property and the search query.

Figure 9:
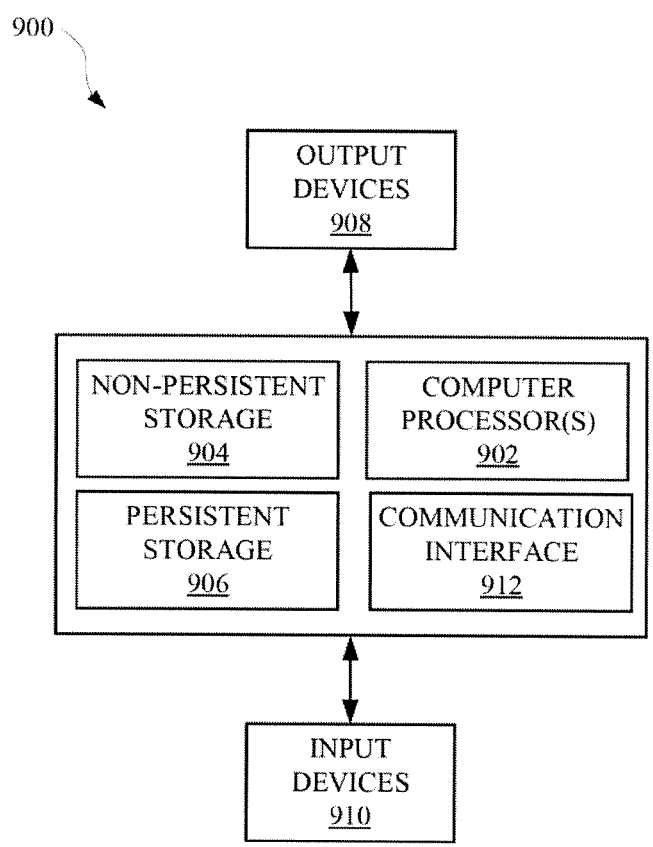
FIG. 9 illustrates a computing system that can access and/or embody the graph database according to some implementations.

Implementations may be implemented on a computing system. Any combination of mobile, desktop, server, router, switch, embedded device, or other types of hardware may be used. For example, as shown in FIG. 9, the computing system 900 may include one or more computer processors 902, non-persistent storage 904 (e.g., volatile memory, such as random access memory (RAM), cache memory), persistent storage 906 (e.g., a hard disk, an optical drive such as a compact disk (CD) drive or digital versatile disk (DVD) drive, a flash memory, etc.), a communication interface 912 (e.g., Bluetooth interface, infrared interface, network interface, optical interface, etc.), and numerous other elements and functionalities.

The computer processor(s) 902 may be an integrated circuit for processing instructions. For example, the computer processor(s) may be one or more cores or micro-cores of a processor. The computing system 900 may also include one or more input devices 910, such as a touchscreen, keyboard, mouse, microphone, touchpad, electronic pen, or any other type of input device.

The communication interface 912 may include an integrated circuit for connecting the computing system 900 to a network (not shown) (e.g., a local area network (LAN), a wide area network (WAN) such as the Internet, mobile network, or any other type of network) and/or to another device, such as another computing device.

Further, the computing system 900 may include one or more output devices 908, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 902, non-persistent storage 904, and persistent storage 906. Many different types of computing systems exist, and the aforementioned input and output device(s) may take other forms.

Software instructions in the form of computer readable program code to perform implementations may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more implementations.

Figure 10:
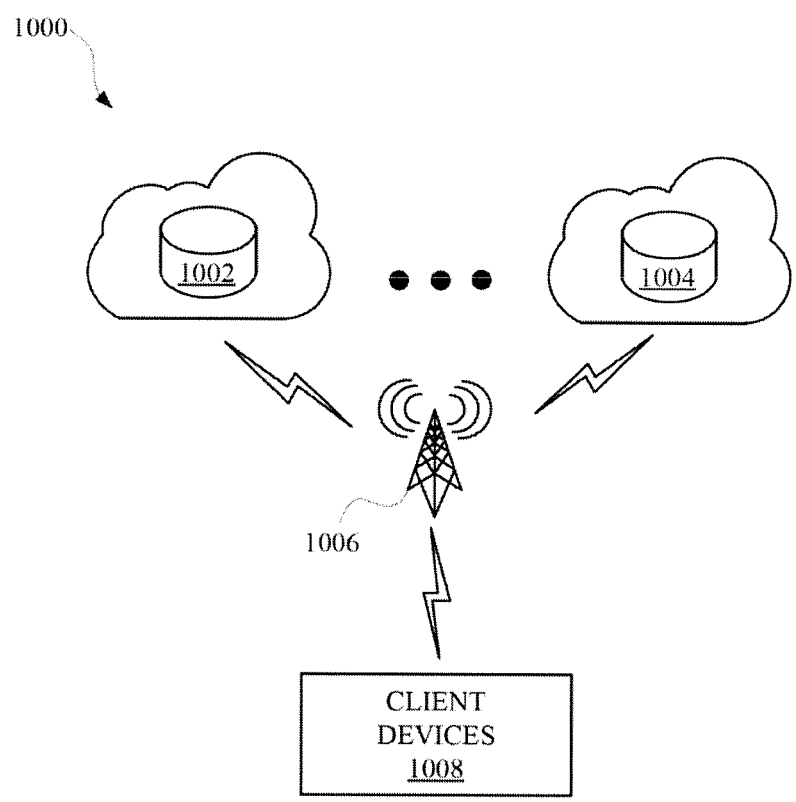
FIG. 10 illustrates a network that can employ the graph database according to some implementations.

The computing system 900 in FIG. 9 may be connected to or be a part of a network, such as the network 1006 described by system 1000 of FIG. 10. For example, as shown in FIG. 10, the network 1006 may include multiple nodes (e.g., node X 1002, node Y 1004). Each node may correspond to a computing system, such as the computing system shown in FIG. 9, or a group of nodes combined may correspond to the computing system shown in FIG. 9. By way of an example, implementations may be implemented on a node of a distributed system that is connected to other nodes. By way of another example, implementations may be implemented on a distributed computing system having multiple nodes, where each portion of the implementation may be located on a different node within the distributed computing system. Further, one or more elements of the aforementioned computing system 900 may be located at a remote location and connected to the other elements over a network.

Although not shown in FIG. 10, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 1002, node Y 1004) in the network 1006 may be configured to provide services for a client device 1008. For example, the nodes may be part of a cloud computing system. The nodes may include functionality to receive requests from the client device 708 and transmit responses to the client device 1008. The client device 1008 may be a computing system, such as the computing system shown in FIG. 9. Further, the client device 1008 may include and/or perform all or a portion of one or more implementations.

The computing system or group of computing systems described in FIGS. 9 and 10 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions present only a few examples of functions performed by the computing system of FIG. 9 and the nodes and/or client device in FIG. 10. Other functions may be performed using one or more implementations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
receiving source data from a remote device comprising a primary storage, the source data associated with a portion of an exploration and production system;
generating, based on the source data, a node and a node edge for a graph database, wherein the node identifies the portion of the exploration and production system and the node edge identifies a relationship between the node and a separate node of the graph database, wherein the graph database comprises a search and analytics backend different than the primary storage, and wherein the graph database is non-operational as the primary storage;

receiving at least a portion of text corresponding to a search query for retrieving data associated with the graph database;

identifying one or more graph database entries associated with the portion of text, the one or more graph database entries corresponding to one or more nodes or node edges of the graph database; and causing one or more search suggestions to be presented, as an intermediate search result received directly from the graph database, based on the identified one or more graph database entries, wherein the one or more suggestions identify at least one node or one node edge with which one or more suggestions correspond.

2. The method of claim 1, further comprising:
querying, after returning the intermediate search result and using the search query or the one or more search suggestions, the source data in the remote device; and
returning a search result from the remote device.

3. The method of claim 1, wherein the one or more search suggestions identify multiple different portions of the exploration and production system.

4. The method of claim 3, wherein the multiple different portions of the exploration and production system include a well, a wellbore, or a field.

5. The method of claim 1, wherein the graph database is accessible to a plugin manager, and the method further comprises:
causing, in response to receiving the source data, a plugin manager to receive a notification indicating that updated exploration and production data has been received.

6. The method of claim 1, further comprising:
identifying a client device that previously accessed the graph database; and
causing, in response to receiving the source data, the client device to receive a notification indicating that updated exploration and production data has been incorporated into the graph database.

7. A system, comprising:
one or more processors; and
memory configured to store instructions that, when executed by one or more processors, cause the one or more processors to perform operations that include:
receiving, at an interface associated with a graph database that includes a portion of exploration and production data, a search query for identifying one or more entities provided in the graph database, the one or more entities corresponding to at least one node and at least one node edge stored at the graph database,
wherein the graph database comprises a search and analytics backend different than a primary storage that stores the exploration and production data, and
wherein the graph database is non-operational as the primary storage;
determining that a property of a node or a node edge includes a similarity to the search query received at the interface, wherein the property identifies a portion of an exploration and production system;
generating one or more search query results based on the similarity between the property and the search query; and
causing the one or more search query results to be presented, as an intermediate search result received directly from the graph database, according to a degree of similarity between the property and the search query.

8. The system of claim 7, wherein the property is an identifier for a piece of equipment of the exploration and production system.

9. The system of claim 7, wherein the node edge identifies a bi-directional relationship between two different nodes.

10. The system of claim 7, wherein the operations further include:
receiving updated exploration and production data from a remote device that is in communication with the exploration and production system; and
causing the graph database to be updated to include an additional node and an additional node edge, each associated with the updated exploration and production data.

11. The system of claim 7, wherein the one or more search query results identify multiple different portions of the exploration and production system.

12. The system of claim 11, wherein the multiple different portions of the exploration and production system include a well, a wellbore, or a field.

13. A non-transitory computer readable medium configured to store instructions that, when executed by one or more processors, cause the one or more processors to perform operations that include:
receiving source data from a remote device comprising a primary storage, the source data associated with a portion of an exploration and production system;
generating, based on the source data, a node and a node edge for a graph database, wherein the node identifies the portion of the exploration and production system and the node edge identifies a relationship between the node and a separate node of the graph database, wherein the graph database comprises a search and analytics backend different than the primary storage, and wherein the graph database is non-operational as the primary storage;
receiving at least a portion of text corresponding to a search query for retrieving data associated with the graph database;
identifying one or more graph database entries associated with the portion of text, the one or more graph database entries corresponding to one or more nodes or node edges of the graph database; and
causing one or more search suggestions to be presented, as an intermediate search result received directly from the graph database, based on the identified one or more graph database entries, wherein the one or more suggestions identify at least one node or one node edge with which one or more suggestions correspond.

14. The non-transitory computer readable medium of claim 13, wherein the Aerations further comprise:
querying, after returning the intermediate search result and using the search query or the one or more search suggestions, the source data in the remote device; and
returning a search result from the remote device.

15. The non-transitory computer readable medium of claim 13, wherein the one or more search suggestions identify multiple different portions of the exploration and production system.

16. The non-transitory computer readable medium of claim 15, wherein the multiple different portions of the exploration and production system include a well, a wellbore, or a field.

17. The non-transitory computer readable medium of claim 13, wherein the graph database is accessible to a plugin manager, and the operations further include:
 causing, in response to receiving the source data, a plugin manager to receive a notification indicating that updated exploration and production data has been received.

18. The non-transitory computer readable medium of claim 13, further comprising:
 identifying a client device that previously accessed the graph database; and
 causing, in response to receiving the source data, the client device to receive a notification indicating that updated exploration and production data has been incorporated into the graph database.

19. The non-transitory computer readable medium of claim 13, wherein the portion of the exploration and production system includes a piece of equipment of the exploration and production system.

20. The non-transitory computer readable medium of claim 13, wherein the node edge identifies a bi-directional relationship between two different nodes.

* * * * *